(12) United States Patent
Wu et al.

(10) Patent No.: US 8,544,998 B2
(45) Date of Patent: Oct. 1, 2013

(54) SOLID INKS CONTAINING KETONE WAXES AND BRANCHED AMIDES

(75) Inventors: Bo Wu, Wilsonville, OR (US); Patricia Ann Wang, Lake Oswego, OR (US); Randall R. Bridgeman, Tualatin, OR (US)

(73) Assignee: Xerox Corporation, Norwalk, CT (US)

(*) Notice: Subject to any disclaimer, the term of this patent is extended or adjusted under 35 U.S.C. 154(b) by 336 days.

(21) Appl. No.: 12/970,487

(22) Filed: Dec. 16, 2010

(65) Prior Publication Data

US 2012/0154479 A1 Jun. 21, 2012

(51) Int. Cl.
*B41J 2/01* (2006.01)

(52) U.S. Cl.
USPC .............................. 347/99; 347/88; 347/100

(58) Field of Classification Search
USPC ............... 347/88, 99, 100, 95, 96, 103, 102, 347/101, 20, 21, 9; 106/31.6, 31.27, 31.13; 523/160, 161
See application file for complete search history.

(56) References Cited

U.S. PATENT DOCUMENTS

| | | | |
|---|---|---|---|
| 4,251,824 A | 2/1981 | Hara et al. | |
| 4,410,899 A | 10/1983 | Haruta et al. | |
| 4,412,224 A | 10/1983 | Sugitani | |
| 4,532,530 A | 7/1985 | Hawkins | |
| 4,601,777 A | 7/1986 | Hawkins et al. | |
| 4,830,671 A | 5/1989 | Frihart et al. | |
| 4,889,560 A | 12/1989 | Jaeger et al. | |
| 4,889,761 A | 12/1989 | Titterington et al. | |
| 5,194,638 A | 3/1993 | Frihart et al. | |
| 5,372,852 A | 12/1994 | Titterington et al. | |
| 5,389,958 A | 2/1995 | Bui et al. | |
| 5,597,856 A | 1/1997 | Yu et al. | |
| 5,782,996 A | 7/1998 | Fan | |
| 5,980,621 A * | 11/1999 | Inaishi et al. | 106/31.29 |
| 6,117,223 A | 9/2000 | Malhotra | |
| 6,121,345 A | 9/2000 | Sawada | |
| 6,123,500 A | 9/2000 | McNeilus et al. | |
| 6,166,104 A | 12/2000 | Kobayashi | |
| 6,174,937 B1 | 1/2001 | Banning et al. | |
| 6,309,453 B1 | 10/2001 | Banning et al. | |
| 6,461,417 B1 | 10/2002 | Malhotra et al. | |
| 6,620,228 B1 | 9/2003 | King et al. | |
| 6,858,070 B1 | 2/2005 | Wong et al. | |
| 6,860,930 B2 * | 3/2005 | Wu et al. | 347/100 |
| 7,186,762 B2 | 3/2007 | Wong et al. | |
| 2008/0098929 A1 * | 5/2008 | Turek et al. | 106/31.62 |
| 2008/0297556 A1 | 12/2008 | Turek et al. | |
| 2009/0038506 A1 * | 2/2009 | Odell et al. | 347/102 |

FOREIGN PATENT DOCUMENTS

GB 2 238 792 6/1991
JP 2007277397 A * 10/2007

OTHER PUBLICATIONS

Apr. 8, 2013 Office Action issued in Canadian Application No. 2,761,421.

* cited by examiner

*Primary Examiner* — Manish S Shah
(74) *Attorney, Agent, or Firm* — Oliff & Berridge, PLC (57) ABSTRACT

A solid ink includes an ink vehicle that is solid at room temperature, including a ketone wax and at least one resin selected from a branched amide resin, a branched urea resin, and a branched urethane resin, a colorant, and optional additives.

19 Claims, 2 Drawing Sheets

SOLID INKS CONTAINING KETONE WAXES AND BRANCHED AMIDES

TECHNICAL FIELD

This disclosure is generally directed to solid ink compositions. More specifically, this disclosure is directed to solid ink compositions including ketone waxes and a branched amid; urea, or urethane resin, methods of making such solid inks, and methods of forming images with such solid inks.

RELATED REFERENCES

U.S. Pat. No. 6,117,223 discloses an ink comprising (a) a nonpolymeric ketone ink vehicle having a melting point of at least about 60° C., (b) a polyketone hardening component, (c) a colorant, (d) a conductivity enhancing agent, (e) an optional antioxidant, (f) an optional viscosity modifier, which is a nonpolymeric carbonate, monoketone, or diketone, and (g) an optional ultraviolet absorber.

U.S. Pat. No. 6,461,417 discloses an ink comprising (1) an ink vehicle of (a) alkyl alkyl ketones of the formula $CH_3(CH_2)_mCO(CH_2)_nCH_3$ where m and n represent the number of segments and wherein each alkyl contains from about 1 to about 25 carbons, (b) alkyl aryl ketones where each alkyl contains from about 1 to about 20 carbons, and the aryl is anthracene, naphthalene or phenyl, or (c) aryl aryl ketones where each aryl is benzyl, phenyl or naphthyl, (2) an ink viscosity component, (3) a conductive compound, (4) an antioxidant compound, (5) a light fastness component, and (6) a colorant.

U.S. Pat. No. 6,166,104 discloses a hot-melt color ink-jet recording process. The process comprises ejecting at least yellow, magenta and cyan hot-melt inks to make a record. The yellow, magenta and cyan hot-melt inks comprise a yellow colorant, a magenta colorant and a cyan colorant, respectively. Each hot-melt ink is prepared by mixing the corresponding colorant with a polyimide resin and a wax, wherein at least one of the yellow and magenta hot-melt inks contains a 1-alkene/maleic anhydride copolymer.

U.S. Pat. No. 6,123,500 discloses a hot-melt ink comprising at least one binder and at least one coloring material dispersed or dissolved in the binder. The hot-melt ink exhibits, during cooling, a peak at a temperature of 61° C. or below on a heating/cooling hysteresis curve plotted for the range of 40° C. to 150° C. using a differential scanning calorimeter (DSC). a heating/cooling hysteresis curve plotted for the range of 40° C. to 150° C. using a differential scanning calorimeter (DSC).

U.S. Pat. No. 6,121,345 discloses a hot-melt ink comprising an amide resin, wherein said amide resin has an amine value of from greater than 0.5 to 1 and an acid value of 2 to 5.

U.S. Pat. No. 5,980,621 discloses a hot-melt ink comprising an amide resin component and a wax component. The wax component comprises at least a montan ester wax and a ketone wax. The montan ester wax and the ketone wax are contained in a total amount of at least 50 wt % based on the total amount of the hot-melt ink.

U.S. Pat. No. 6,860,930 discloses a phase change ink composition comprising (a) a colorant and (b) a carrier comprising a polyamide, wherein the polyamide component of the carrier contains at least about 10 percent by weight of a branched triamide.

The entire disclosure of the above-mentioned patents are totally incorporated herein by reference.

BACKGROUND

Inkjet printing systems and solid inks are known in the art. However, while known solid ink compositions are used successfully, a need remains for improved solid ink compositions capable of being used to develop higher quality images at lower cost and using more environmentally-friendly materials.

Printer inks have been developed to satisfy a need for jetting solid ink at low temperatures, such as about 110° C. Jetting at low temperatures reduces energy consumption, permits use of less expensive print heads, improves color stability, reduces wear on printers, and enables instant on modes and quick recovery standby modes.

Wax accounts for about 50 percent by weight of most commercial solid inks and dictates much of the ink's performance and cost. Due to its narrow molecular weight distribution, a specially distilled polyethylene wax has generally been used in solid inks to enable jetting at low temperatures. However, the distilled polyethylene wax is relatively expensive because the distillation process involves cutting off both high and low molecular weight (MW) portions of the wax. Furthermore, polyethylene wax is derived from fossil oil, which is not a renewable material.

Hence, there is a need for wax alternatives that cost less and are made from renewable resources such as plants or animals.

SUMMARY

The present disclosure in embodiments addresses these various needs and problems by providing an ink vehicle that is solid at room temperature comprising a ketone wax and at least one resin. The resin may be, for example, a branched amide resin, a branched urea resin, or a branched urethane resin. The ink may also comprise colorants and other additives.

Compared to conventional polyethylene waxes used in known solid inks, embodiments of the disclosure using the ketone wax have one or more of a lower manufacturing cost, a narrower molecular weight distribution, a narrower melting range, higher polarity, and better dye dissolving power, and the ink compositions can be made from renewable resources. Therefore, more than 75% of the raw material in the resulting inks can be made from renewable resources.

These and other improvements are accomplished by the compositions and methods described in embodiments herein.

EMBODIMENTS

This disclosure is not limited to the particular embodiments described herein, and some components and processes may be varied by one of ordinary skill, based on this disclosure.

Exemplary ink compositions provide superior print quality while enabling the use of a greater proportion of renewable, environmentally-friendly materials. The present disclosure provides an ink composition comprising a ketone wax and a branched amide, urea, or urethane resin, where the ketone wax provides benefits over ink compositions using a conventional polyethylene wax, and branched amides, urethanes, urea provide mechanical strength without significantly increasing the ink viscosity (thus jetting temperature) because of their branched structure features.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The term "functional group" refers, for example, to a group of atoms arranged in a way that determines the chemical properties of the group and the molecule to which it is attached. Examples of functional groups include halogen atoms, hydroxyl groups, carboxylic acid groups, and the like.

As used herein, the term "viscosity" refers to a complex viscosity, which is the typical measurement provided by a mechanical rheometer capable of subjecting a sample to a steady shear strain or a small amplitude sinusoidal deformation. In this type of instrument, the shear strain is applied by the operator to the motor and the sample deformation (torque) is measured by the transducer. Alternatively, a controlled-stress instrument, where the shear stress is applied and the resultant strain is measured, may be used. Such a rheometer provides a periodic measurement of viscosity at various plate rotation frequencies, ω, rather than the transient measurement of, for instance, a capillary viscometer. The reciprocating plate rheometer is able to measure both the in phase and out of phase fluid response to stress or displacement. The complex viscosity, η*, is defined as η*=η'−iη"; where η'G"/ω, η"=G'/ω and i is √−1. Alternatively, a viscometer that can measure only the transient measurement of, for instance, a capillary or shear viscosity can also be used.

Ink Vehicles

In embodiments, the solid ink includes at least one ink vehicle (also known as a carrier material) or a mixture of two or more ink vehicles. The ink vehicle of embodiments comprises a ketone wax and a branched amide, urea, or urethane resin.

The ink vehicle or mixture is solid at temperatures of about 20° C. to about 27° C., for example room temperature, and specifically is solid at temperatures below about 40° C. However, the ink vehicle changes phase upon heating, and is in a molten state at jetting temperatures.

In embodiments, the ink vehicle may have a melting point of from about 60° C. to about 150° C., for example from about 80° C. to about 120° C., from about 85° C. to about 110° C., from about 100° C. to about 110° C., or from about 105° C. to about 110° C. as determined by, for example, observation and measurement using a DSC. Higher melting points are also acceptable, although printhead life may be reduced at temperatures higher than 150° C.

The ink vehicle of embodiments, exclusive of other additives such as colorants, antioxidants, gellants, and the like, comprises a ketone wax in combination with a branched amide, urea, or urethane resin. The ketone wax can be present as a majority component of the ink vehicle or a minority component of the ink vehicle, but the degree of benefits that the ketone wax provides increases as the content of the ketone wax is increased.

Examples of suitable ketone ink vehicles include (a) alkyl alkyl ketones, including those of the general formula wherein R and R' each, independently of the other, is an alkyl group, including linear, branched, cyclic, saturated, unsaturated, and substituted alkyl groups, typically with from 1 to about 25 carbon atoms, although the number of carbon atoms can be outside of this range, with specific examples including (1) n-octyl-n-propyl ketone (ICN #213357), (2) n-octyl-n-butyl ketone (ICN #206848), (3) n-decyl-n-ethyl ketone (ICN #204911), (4) n-undecyl-n-propyl ketone (ICN #207355), (5) n-dodecyl-n-ethyl ketone (ICN #209666), (5) di-n-hexylketone (ICN #215620), (6) di-n-heptylketone (ICN #209745), (7) di-n-octyl ketone (ICN #204765), (8) di-n-nonyl ketone (ICN #212765), (9) di-n-decyl ketone (ICN #215139), (10) di-n-undecyl ketone (ICN #203303), (11) di-n-tridecyl ketone (ICN #213235), (12) di-n-heptadecyl ketone (ICN #201684), (13) di-n-octadecyl ketone (ICN #201684), and the like, as well as mixtures thereof, (b) alkyl aryl ketones, including those of the general formula wherein R is an alkyl group, including linear, branched, cyclic, saturated, unsaturated, and substituted alkyl groups, typically with from 1 to about 20 carbon atoms, although the number of carbon atoms can be outside of this range, and Ar is an aryl group, including substituted aryl groups, typically with from 6 to about 25 carbon atoms, although the number of carbon atoms can be outside of this range, such as phenyl, naphthyl, anthryl, or the like, with specific examples including (1) n-octyl phenyl ketone (obtained from ICN Biomedical; ICN #204935), (2) n-undecyl phenyl ketone (ICN #217796), (3) n-pentadecyl phenyl ketone (ICN #225428), (4) n-octadecyl phenyl ketone (available as #00185 from TCI America), and the like, as well as mixtures thereof, (c) aryl aryl ketones, including those of the general formula wherein Ar and Ar' each, independently of the other, is an aryl group, including substituted aryl groups, typically with from 6 to about 25 carbon atoms, although the number of carbon atoms can be outside of this range, such as phenyl, naphthyl, anthryl, or the like, with specific examples including (1) diphenyl acetone (ICN #208157, ICN #206354), (2) 2-naphthyl phenyl ketone (available as #130301 from TCI America), and the like, as well as mixtures thereof, (d) aryl arylalkyl ketones and aryl alkylaryl ketones, including those of the general formulae and wherein Ar and Ar' each, independently of the other, is an aryl group, including substituted aryl groups, typically with from 6 to about 25 carbon atoms, although the number of carbon atoms can be outside of this range, such as phenyl, naphthyl, anthryl, or the like, and R is an alkyl group, including linear, branched, cyclic, saturated, unsaturated, and substituted alkyl groups, typically with from 1 to about 25 carbon atoms, although the number of carbon atoms can be outside of this range, with specific examples including (1) benzyl phenyl ketone (ICN #202318) and the like, (e) arylalkyl arylalkyl ketones, arylalkyl alkylaryl ketones, and alkylaryl alkylaryl ketones, including those of the general formulae wherein Ar and Ar' each, independently of the other, is an aryl group, including substituted aryl groups, typically with from 6 to about 25 carbon atoms, although the number of carbon atoms can be outside of this range, such as phenyl, naphthyl, anthryl, or the like, and R and R' each, independently of the other, is an alkyl group, including linear, branched, cyclic, saturated, unsaturated, and substituted alkyl groups, typically with from 1 to about 25 carbon atoms, although the number of carbon atoms can be outside of this range, with examples of suitable substituents on the substituted alkyl, aryl, arylalkyl, and alkylaryl groups including (but not being limited to) hydroxy groups, amine groups, imine groups, ammonium groups, pyridine groups, pyridinium groups, ether groups, ester groups, amide groups, carbonyl groups, thiocarbonyl groups, sulfate groups, sulfonate groups, sulfide groups, sulfoxide groups, phosphine groups, phosphonium groups, phosphate groups, mercapto groups, nitroso groups, sulfone groups, acyl groups, acid anhydride groups, azide groups, and the like. Specific examples of suitable ketones include (1) di-n-benzyl ketone (obtained from ICN Biomedicals; ICN #208157) and the like; and (f) mixtures thereof.

Examples of suitable ketone waxes include stearones such as T-1 (Kao Corporation), KLB-766 (C21-CO—C21 ketone) (Kao Corporation), KLB-770 (C17-CO C17 ketone) (Kao Corporation), and laurones such as LAURONE (Kanto Kagaku Co. Ltd.) and the like.

The ketone waxes typically have a melting point of from about 60° C. to about 110° C., such as from about 65° C. to about 105° C., such as from about 70° C. to about 100° C. The ketone waxes are present in the ink in any desired or effective amount, such as from about 5 percent by weight of the ink to about 98 percent by weight of the ink, such as from about 15 percent by weight of the ink to about 70 percent by weight of the ink, such as about 50 percent by weight of the ink.

The ketone waxes may have a narrow molecular weight distribution. For example, the ketone waxes may have a molecular weight distribution of from about 1.001 to about 1.110, such as from about 1.005 to about 1.105, from about 1.010 to about 1.100, or from about 1.030 to about 1.070.

The ink vehicle in embodiments also includes a branched resin that improves the mechanical strength of inks, which may be a branched amide, urea, or urethane resin. As compared to non-branched or linear resin of the similar molecular weight, the branched resin has lower viscosity, and properties that enable low temperature jetting. The resin may be present in embodiments of the solid ink in an amount from about 1 percent to about 35 percent by weight of the solid ink, such as about 5 percent to about 30 percent by weight of the solid ink, such as from about 10 percent to about 25 percent by weight of the solid ink.

Any suitable branched amide, urea, or urethane resin, or mixture thereof, can be used in combination with the ketone wax to provide the ink composition with desirable properties such as toughness or mechanical strength. Suitable non-limiting examples are described below.

Examples of suitable amides for use as ink vehicle materials include monoamides, triamides, tetra-amides, and mixtures thereof.

Resins suitable for use herein include triamides, such as those disclosed in U.S. Pat. No. 6,860,930 and U.S. Patent Application Publication No. 2008/0098929 (the entire disclosures of which are incorporated herein by reference).

Examples of suitable branched triamides include those triamides disclosed in U.S. Pat. No. 6,860,930 and U.S. Patent Application Pub. No. 2008/0297556, each of which are incorporated herein in their entirety by reference. Any branched triamide disclosed in U.S. Pat. No. 6,860,930 and U.S. Patent Application Pub. No. 2008/0297556, is suitable for use herein.

Examples of branched triamides suitable for use herein include those having the formulas:

and, for example, the like that are disclosed in U.S. Pat. No. 6,860,930.

In such branched triamides, $R_1$ and $R_2$ may be (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), having from about 3 carbon atoms to about 200 carbon atoms, such as from about 15 carbon atoms to about 150 carbon atoms or from about 21 carbon atoms to about 60 carbon atoms; (ii) an arylene group (including unsubstituted and substituted arylene groups, and wherein hetero atoms, such as oxygen, nitrogen, sulfur, silicon, phosphorus, and the like either may or may not be present in the arylene group), having from about 6 carbon atoms to about 200 carbon atoms, such as from about 10 carbon atoms to about 150 carbon atoms or from about 14 carbon atoms to about 60 carbon atoms; (iii) an arylalkylene group (including unsubstituted and substituted arylalkylene groups; wherein the alkyl portion of the arylalkylene group can be linear, branched, saturated, unsaturated, and/or cyclic; and wherein hetero atoms, such as oxygen, nitrogen, sulfur, silicon, phosphorus, and the like either may or may not be present in either or both of the alkyl portion and the aryl portion of the arylalkylene group), having from about 7 carbon atoms to about 200 carbon atoms, such as from about 8 carbon atoms to about 150 carbon atoms, such as from about 9 carbon atoms to about 50 carbon atoms; or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group), having from about 7 carbon atoms to about 200 carbon atoms, such as from about 8 carbon atoms to about 150 carbon atoms or from about 9 carbon atoms to about 60 carbon atoms, such as tolylene or the like.

In such branched triamides, $R_a$, $R_b$, $R_c$, $R_g$, $R_h$, $R_j$, $R_k$, $R_p$, and $R_q$ may each independently be (i) a hydrogen atom; (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in embodiments from about 1 carbon atoms to about 200 carbon atoms, such as from about 6 carbon atoms to about 150 carbon atoms or from about 10 carbon atoms to about 60 carbon atoms; (iii) an aryl group (including unsubstituted and substituted aryl groups, and wherein hetero atoms, such as oxygen, nitrogen, sulfur, silicon, phosphorus, and the like either may or may not be present in the aryl group), having from about 6 carbon atoms to about 200 carbon atoms, such as from about 10 carbon atoms to about 150 carbon atoms or from about 14 carbon atoms to about 60 carbon atoms; (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), having from about 6 carbon atoms to about 200 carbon atoms, such as from about 7 carbon atoms to about 150 carbon atoms or from about 8 carbon atoms to about 60 carbon atoms, such as benzyl or the like; or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), having from about 6 carbon atoms to about 200 carbon atoms, such as from about 7 carbon atoms to about 150 carbon atoms or from about 8 carbon atoms to about 60 carbon atoms, such as tolyl or the like.

In such branched triamides, $R_d$, $R_e$, and $R_f$ may each independently be (i) an alkyl group as described above, (ii) an aryl group as described above, (iii) an arylalkyl group as described above, or (iv) an alkylaryl group as described above.

In one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, those generated from branched diamino monoacid compounds, said branched triamides being of the formula:

wherein $R_1$, $R_a$, $R_h$, $R_d$, $R_e$, $R_g$, and $R_h$ are as defined hereinabove, those generated from branched monoamino diacid compounds, said branched triamides being of the formula:

wherein $R_2$, $R_a$, $R_d$, $R_g$, $R_h$, $R_j$, and $R_k$ are as defined hereinabove, and the like, wherein the substituents on the substituted alkyl, alkylene, aryl, arylene, arylalkyl, arylalkylene, alkylaryl, and alkylarylene groups can be (but are not limited to) hydroxy groups, halogen atoms, imine groups, ammonium groups, cyano groups, pyridine groups, pyridinium groups, ether groups, aldehyde groups, ketone groups, ester groups, carbonyl groups, thiocarbonyl groups, sulfate groups, sultanate groups, sulfonic acid groups, sulfide groups, sulfoxide groups, phosphine groups, phosphonium groups, phosphate groups, nitrile groups, mercapto groups, nitro groups, nitroso groups, sulfone groups, azide groups, azo groups, cyanato groups, carboxylate groups, mixtures thereof, and the like, wherein two or more substituents can be joined together to form a ring.

In one specific embodiment, when the triamide is of the formula:

the total number of carbon atoms in $R_1+R_a+R_b+R_c+R_d+R_e+R_f$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges.

In one specific embodiment, when the triamide is of the formula:

the total number of carbon atoms in $R_2+R_g+R_h+R_j+R_k+R_p+R_q$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges.

In one specific embodiment, when the triamide is of the formula:

the total number of carbon atoms in $R_1+R_a+R_b+R_d+R_e+R_g+R_h$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges.

In one specific embodiment, when the triamide is of the formula:

the total number of carbon atoms in $R_2+R_a+R_d+R_g+R_h+R_j+R_k$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges.

If desired, other conventional materials can be used as part of the ink vehicle. Such conventional materials include, for example, ethylene/propylene copolymers, branched hydrocarbons, hydrocarbon-based waxes, paraffins, high molecular weight linear alcohols, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers. Such materials can be used singularly or in mixtures of two or more, in addition to the ketone wax and the branched amide, urea, or urethane resin.

Additional examples of materials that may be included in the ink vehicle include rosin esters, such as glyceryl abietate (KE-100®); polyamides; dimer acid amides; fatty acid amides, including ARAMID C; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; polysulfonamides, including KETJENFLEX MH and KETJENFLEX MS80; benzoate esters, such as BENZOFLEX S552, available from Velsicol Chemical Company; phthalate plasticizers; citrate plasticizers; maleate plasticizers; polyvinyl pyrrolidinone copolymers; polyvinyl pyrrolidone/polyvinyl acetate copolymers; novolac resins, such as DUREZ 12 686, available from Occidental Chemical Company; and natural product waxes, such as beeswax, candelilla wax, montan wax, GILSONITE (American Gilsonite Company), and the like; mixtures of linear primary alcohols with linear long-chain amides or fatty acid amides, such as those with from about 6 to about 24 carbon atoms, including PARICIN 9 (propylene glycol monohydroxystearate), PARICIN 13 (glycerol monohydroxystearate), PARICIN 15 (ethylene glycol monohydroxystearate), PARICIN 220 (N(2-hydroxyethyl)-12-hydroxystearamide), PARICIN 285 (N,N'-ethylene-bis-12-hydroxystearamide), FLEXRICIN 185 (N,N'-ethylene-bis-ricinoleamide); and the like. Further, linear long-chain sulfones with from about 4 to about 16 carbon atoms, such as diphenyl sulfone, n-aryl sulfone, n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, chlorophenyl methyl sulfone, and the like, are suitable ink vehicle materials.

Examples of urethane waxes that may be used include the reaction product of an isocyanate and an alcohol. Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Examples of monoisocyanates include n-octadecylisocyanate, hexadecylisocyanate; octylisocyanate; n- and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like, as well as mixtures thereof. Examples of diisocyanates include isophorone diisocyanate (IPDI), toluene diisocyanate (TDI); diphenylmethane-4,4'-diisocyanate (MDI); hydrogenated diphenylmethane-4,4'-diisocyanate; tetra-methyl xylene diisocyanate (TMXDI); hexamethylene-1,6-diisocyanate (HDI), naphthalene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethyl-1,6-diisocyanatohexane, tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

Additional resins and waxes may further be selected from the group consisting of a urethane resin obtained from the reaction of two equivalents of ABITOL E hydroabietyl alcohol and one equivalent of isophorone diisocyanate, prepared as described in U.S. Pat. No. 5,782,996, the disclosure of which is totally incorporated herein by reference; a urethane resin that was the adduct of three equivalents of stearyl isocyanate and a glycerol base alcohol, prepared as described in Example 4 of U.S. Pat. No. 6,309,453 the disclosure of which is totally incorporated herein by reference; and suitable amides including, for example, diamides, triamides, tetraamides, cyclic amides, and the like. Fatty amides including monoamides, tetra-amides, and mixtures thereof, may also be included in the ink vehicle such as, for example, those described in U.S. Pat. Nos. 4,889,560, 4,889,761, 5,194,638, 4,830,671, 6,174,937, 5,372,852, 5,597,856, and 6,860,930 and British Patent No. GB 2 238 792, the entire disclosures of each are incorporated herein by reference; and those similar to what is described in U.S. Pat. No. 6,620,228, which is incorporated herein by reference in its entirety.

Fatty amides, such as monoamides, tetra-amides, mixtures thereof, and the like, such as those described in U.S. Pat. No. 6,858,070, incorporated herein by reference, may also be used. Suitable monoamides may have a melting point of at least about 50° C., for example from about 50° C. to about 150° C., although the melting point can be below this temperature. Specific examples of suitable monoamides include primary monoamides and secondary monoamides. Exemplary primary monoamides include stearamide, such as KEMAMIDE S available from Chemtura Corp. and CRODAMIDE S available from Croda; behenamide/arachidamide, such as KEMAMIDE B available from Chemtura and CRODAMIDE BR available from Croda; oleamide, such as KEMAMIDE U available from Chemtura and CRODAMIDE OR available from Croda, technical grade oleamide, such as KEMAMIDE O available from Chemtura, CRODAMIDE O available from Croda, and UNISLIP 1753 available from Uniqema; and erucamide such as KEMAMIDE E available from Chemtura and CRODAMIDE ER available from Croda. Exemplary secondary amides include behenyl behenamide, such as KEMAMIDE EX666 available from Chemtura; stearyl stearamide, such as KEMAMIDE S-180 and KEMAMIDE EX-672 available from Chemtura; stearyl erucamide, such as KEMAMIDE E-180 available from Chemtura and CRODAMIDE 212 available from Croda; erucyl erucamide, such as KEMAMIDE E-221 available from Chemtura; oleyl palmitamide, such as KEMAMIDE P-181 available from Chemtura and CRODAMIDE 203 available from Croda; and erucyl stearamide, such as KEMAMIDE S-221 available from Chemtura. Additional suitable amide materials include KEMAMIDE W40 (N,N'-ethylenebisstearamide), KEMAMIDE P181 (oleyl palmitamide), KEMAMIDE W45 (N,N'-ethylenebisstearamide), and KEMAMIDE W20 (N,N'-ethylenebisoleamide).

The ink vehicle may comprise from about 25% to about 99.5% by weight of the ink, such as from about 30% to about 98%, from about 50% to about 85%, or from about 70% to about 80%.

Colorants

Embodiments may also include colorants, such as pigment, dye, mixtures of pigment and dye, mixtures of pigments, mixtures of dyes, and the like. As the pigment colorant media, any suitable pigment may be used without limitation so long as the colorant is dispersible within the ink vehicle. Examples of suitable pigments include, but are not limited to, PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); HOSTAPERM Blue B2G-D (Clariant); Permanent Red P-F7RK; HOSTAPERM Violet BL (Clariant); LITHOL Scarlet 4440 (BASF); Bon Red C (Dominion Color Company); ORACET Pink RF (Ciba); PALIOGEN Red 3871 K (BASF); Sunfast®. Blue 15:3 (Sun Chemical 249-1284); PALIOGEN Red 3340 (BASF); Sunfast®. Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac®. Orange 16 (Sun Chemical 276-3016); HELIOGEN Blue K6902, K6910 (BASF); Sunfast®. Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL® 330 (Cabot), Carbon Black 5250 (Columbia Chemical), Carbon Black 5750 (Columbia Chemical), mixtures thereof and the like.

There are no particular restrictions regarding the aforementioned pigments. Any pigments commonly used in the field of printing, either organic or inorganic, may be employed. Examples of the pigments include carbon black, cadmium red, molybdenum red, chrome yellow, cadmium yellow, titan yellow, chromium oxide, viridian, titan cobalt green, ultramarine blue, Prussian blue, cobalt blue, azo pigments, phthalocyanine pigments, quinacridone pigments, isoindolinone pigments, dioxazine pigments, threne pigments, perylene pigments, perinone pigments, thioindigo pigments, quinophthalone pigments, metal complex pigments, and the like. These may be used individually or in combinations of two or more.

There are no particular restrictions regarding the aforementioned dyes. Examples of the dyes include azo dyes, disazo dyes, metal complex salt dyes, naphthol dyes, anthraquinone dyes, indigo dyes, carbonium dyes, quinoneimine dyes, cyanine dyes, quinoline dyes, nitro dyes, nitroso dyes, benzoquinone dyes, naphthoquinone dyes, xanthene dyes, phthalocyanine dyes, metal phthalocyanine dyes, and other oil-soluble dyes. These may be used individually or in combinations of two or more. They may also be used in conjunction with the pigments listed above.

In embodiments, the total colorant may comprise from about 0.1% to about 10% by weight of the ink, such as from about 0.2% to about 5% by weight of the ink.

Additional Additives

The ink of embodiments may further include conventional additives to take advantage of the known functionality associated with such conventional additives. Such additives may include, for example, dispersants, propellants, biocides, defoamers, slip and leveling agents, plasticizers, viscosity modifiers, antioxidants, UV absorbers, tackifiers, adhesives, conductivity enhancing agents, etc.

DISPERSANTS. To enable dispersion of the pigment colorants in the liquid vehicle, a dispersant or combination of dispersants may optionally be provided. Typically, dispersants may be used to stabilize particles in the non-polar ink vehicle. The dispersant generally comprises first functional groups that anchor the dispersant to the pigment particles and second functional groups that are compatible with the ink vehicle. The first functional groups can suitably anchor or adsorb to the pigment particle in any suitable manner, such as hydrogen bonding, chemical bonding, acid-base reaction, Van der Waals interactions, and the like.

Thus, examples of suitable first functional groups that anchor the dispersant to the pigment particles include such functional groups as esters, amides, carboxylic acids, hydroxyl groups, anhydrides, urethanes, ureas, amines, amides, salt groups such as quaternary ammonium salts, and the like. The first functional groups anchor the dispersant to the colorant particles such that the dispersant is, for example, adsorbed, attached to, or grafted to the pigment particle. Likewise, examples of the second functional groups that are compatible with the ink vehicle include groups such as alkyl groups, which can be straight or branched, saturated or unsaturated, and the like. These second functional groups are compatible with, in particular, low polarity ink vehicle components.

Examples of suitable dispersants that may be used in embodiments include, but are not limited to, BYK-UV 3500, BYK-UV 3510 (BYK-Chemie); Dow Corning 18, 27, 57, 67 Additives; ZONYL FSO 100 (DuPont); MODAFLOW 2100 (Solutia); FOAM BLAST 20F, 30, 550 (Lubrizol); EFKA-1101, -4046, -4047, -2025, -2035, -2040, -2021, -3600, -3232; SOLSPERSE 13240, 16000, 17000, 17940, 19000, 28000, 32500, 38500, 39000, 54000 (Lubrizol); and mixtures thereof. Individual dispersants or combinations may optionally be used with synergists including SOLSPERSE 5000, 12000, 22000 (Lubrizol); DISPERBYK-108, -163, -167, 182 (BYK-Chemie); and K-SPERSE 132, XD-A503, XD-A505 (King Industries).

The dispersant may be present in the solid ink in any effective amount, such as in amounts of from about 0.5% to about 40% by weight of the ink, such as from about 5% to about 25%, or from about 8% to about 13%.

PLASTICIZERS. The ink may include an optional plasticizer, such as UNIPLEX 250 (commercially 20 available from Uniplex); the phthalate ester plasticizers commercially available from Monsanto under the trade name SANTICIZER, such as dioctyl phthalate, diundecyl phthalate, alkylbenzyl phthalate (SANTICIZER 278); triphenyl phosphate (commercially available from Monsanto); KP-140, a tributoxyethyl phosphate (commercially available from FMC Corporation); MORFLEX® 150, a dicyclohexyl phthalate (commercially available from Morflex Chemical Company Inc.); trioctyl trimellitate (commercially available from Eastman Kodak Co.); pentaerythritol tetrabenzoate, commercially available as BENZOFLEX S552 (Velsicol Chemical Corporation); trimethyl titrate, commercially available as CITROFLEX 1 (Monflex Chemical Company); N,N-dimethyl oleamide, commercially available as HALCOMID M-18-OL (C. P. Hall Company); a benzyl phthalate, commercially available as SANTICIZER 278 (Ferro Corporation); R12, a branched urethane plasticizer (as described in U.S. Pat. No. 6,860,930); and the like.

Plasticizers may either function as the ink vehicle or may act as an agent to provide compatibility between the ink propellant, which generally is polar, and the ink vehicle, which generally is non-polar. In embodiments, if the plasticizer functions as the ink vehicle, it may constitute from about 1% to 100% of the ink vehicle component of the ink. Alternatively, if the plasticizer functions as an additive in addition to another ink vehicle, the plasticizer may be present in an amount of at least about 0.05% by weight of the ink, such as at least about 1%, or at least about 2%, but typically no more than about 15%.

VISCOSITY MODIFIERS. The ink may further include an optional viscosity modifier. Examples of suitable viscosity modifiers include aliphatic ketones; stearone; 2-hydroxybenzyl alcohol; 4-hydroxybenzyl alcohol; 4-nitrobenzyl alcohol; 4-hydroxy-3-methoxy benzyl alcohol; 3-methoxy-4-nitrobenzyl alcohol; 2-amino-5-chlorobenzyl alcohol; 2-amino-5-methylbenzyl alcohol; 3-amino-2-methylbenzyl alcohol; 3-amino-4-methyl benzyl alcohol; 2(2-(aminomethyl) phenylthio) benzyl alcohol; 2,4,6-trimethylbenzyl alcohol; 2-amino-2-methyl-1,3-propanediol; 2-amino-1-phenyl-1,3-propanediol; 2,2-dimethyl-1-phenyl-1,3-propanediol; 2-bromo-2-nitro-1,3-propanediol; 3-tert-butylamino-1,2-propanediol; 1,1-diphenyl-1,2-propanediol; 1,4-dibromo-2,3-butanediol; 2,3-dibromo-1,4-butanediol; 2,3-dibromo-2-butene-1,4-diol; 1,1,2-triphenyl-1,2-ethanediol; 2-naphthalenemethanol; 2-methoxy-1-naphthalenemethanol; decafluoro benzhydrol; 2-methylbenzhydrol; 1-benzeneethanol; 4,4'-isopropylidene bis(2-(2,6-dibromo phenoxy) ethanol); 2,2'-(1,4-phenylenedioxy)diethanol; 2,2-bis(hydroxymethyl)-2,2',2"-nitrilotriethanol; di(trimethylolpropane); 2-amino-3-phenyl-1-propanol; tricyclohexylmethanol; tris(hydroxymethyl) aminomethane succinate; 4,4'-trimethylene bis(1-piperidine ethanol); N-methyl glucamine; xylitol; or mixtures thereof.

ANTIOXIDANTS. The ink may optionally contain antioxidants to protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba-Geigy Corporation), (2) 2,2-bis(4-(2-(3,5-di-tert-butyl-4-hydroxyhydrocinnamoyloxy))ethoxyphenyl) propane (TOPANOL-205, available from ICI America Corporation), (3) tris(4-tert-butyl-3-hydroxy-2,6-dimethyl benzyl)isocyanurate (CYANOX 1790, 41,322-4, LTDP, Aldrich D12, 840-6), (4) 2,2'-ethylidene bis(4,6-di-tert-butylphenyl) fluoro phosphonite (ETHANOX-398, available from Ethyl Corporation), (5) tetrakis(2,4-di-tert-butylphenyl)-4,4'-biphenyl diphosphonite (ALDRICH 46, 852-5; hardness value 90), (6) pentaerythritol tetrastearate (TCI America #P0739), (7) tributylammonium hypophosphite (Aldrich 42,009-3), (8) 2,6-di-tert-butyl-4-methoxyphenol (Aldrich 25, 106-2), (9) 2,4-di-tert-butyl-6-(4-methoxybenzyl)phenol (Aldrich 23,008-1), (10) 4-bromo-2,6-dimethylphenol (Aldrich 34, 951-8), (11) 4-bromo-3,5-didimethylphenol (Aldrich B6, 420-2), (12) 4-bromo-2-nitrophenol (Aldrich 30, 987-7), (13) 4-(diethyl aminomethyl)-2,5-dimethylphenol (Aldrich 14, 668-4), (14) 3-dimethylaminophenol (Aldrich D14, 400-2), (15) 2-amino-4-tert-amylphenol (Aldrich 41, 258-9), (16) 2,6-bis(hydroxymethyl)-p-cresol (Aldrich 22, 752-8), (17) 2,2'-methylenediphenol (Aldrich 134, 680-8), (18) 5-(diethylamino)-2-nitrosophenol (Aldrich 26, 951-4), (19) 2,6-dichloro-4-fluorophenol (Aldrich 28, 435-1), (20) 2,6-dibromo fluoro phenol (Aldrich 26,003-7), (21) α-trifluoro-o-creso-1 (Aldrich 21, 979-7), (22) 2-bromo-4-fluorophenol (Aldrich 30, 246-5), (23) 4-fluorophenol (Aldrich F1, 320-7), (24) 4-chlorophenyl-2-chloro-1,1,2-tri-fluoroethyl sulfone (Aldrich 13, 823-1), (25) 3,4-difluoro phenylacetic acid (Aldrich 29,043-2), (26) 3-fluorophenylacetic acid (Aldrich 24, 804-5), (27) 3,5-difluoro phenylacetic acid (Aldrich 29,044-0), (28) 2-fluorophenylacetic acid (Aldrich 20, 894-9), (29) 2,5-bis(trifluoromethyl)benzoic acid (Aldrich 32, 527-9), (30) ethyl-2-(4-(4-(trifluoromethyl)phenoxy)phenoxy) propionate (Aldrich 25,074-0), (31) tetrakis (2,4-di-tert-butyl phenyl)-4,4'-biphenyl diphosphonite (Aldrich 46, 852-5), (32) 4-tert-amyl phenol (Aldrich 15, 384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Uniroyal Chemical Company), and the like, as well as mixtures thereof. The antioxidant, when present, may be present in the ink in any desired or effective amount, such as from about 1% to about 10% by weight of the ink or from about 1% to about 5%.

UV ABSORBERS. The ink may also optionally contain a UV absorber. The optional UV absorbers primarily protect the generated images from UV degradation. Specific examples of suitable UV absorbers include (1) 2-bromo-2',4-dimethoxyacetophenone (Aldrich 19, 948-6), (2) 2-bromo-2',5'-dimethoxyacetophenone (Aldrich 10, 458-2), (3) 2-bromo-3'-nitroacetophenone (Aldrich 34, 421-4), (4) 2-bromo-4'-nitroacetophenone (Aldrich 24, 561-5), (5) 3',5'-diacetoxyacetophenone (Aldrich 11, 738-2), (6) 2-phenylsulfonyl acetophenone (Aldrich 34, 150-3), (7) 3'-aminoacetophenone (Aldrich 13, 935-1), (8) 4'-aminoacetophenone (Aldrich A3, 800-2), (9) 1H-benzotriazole-1-acetonitrile (Aldrich 46, 752-9), (10) 2-(2H-benzotriazol-2-yl)-4,6-di-tert-pentylphenol (Aldrich 42, 274-6), (11) 1,1-(1,2-ethane-diyl) bis(3,3,5,5-tetramethylpiperazinone) (commercially available from Goodrich Chemicals), (12) 2,2,4-trimethyl-1,2-hydroquinoline (commercially available from Mobay Chemical), (13) 2-(4-benzoyl-3-hydroxy phenoxy)ethylacrylate, (14) 2-dodecyl-N-(1,2,2,6,6-pentamethyl-4-piperidinyl) succinimide (commercially available from Aldrich Chemical Co., Milwaukee, Wis.), (15) 2,2,6,6-tetramethyl-4-piperidinyl/β-tetramethyl-3,9-(2,4,8,10-tetraoxo spiro(5,5)-undecane) diethyl-1,2,3,4-butane tetracarboxylate (commercially available from Fairmount), (16) N-(p-ethoxycarbonylphenyl)-N'-ethyl-N'-phenylformadine (commercially available from Givaudan), (17) 6-ethoxy-1,2-dihydro-2,2,4-trimethylquinoline (commercially available from Monsanto Chemicals), (18) 2,4,6-tris-(N-1,4-dimethylpentyl-4-phenylenediamino)-1,3,5-triazine (commercially available from Uniroyal), (19) 2-dodecyl-N-(2,2,6,6-tetrame-thyl-4-piperidinyl) succinimide (commercially available from Aldrich Chemical Co.), (20) N-(1-acetyl-2,2,6,6-tetramethyl-4-piperidinyl)-2-dodecyl succinimide (commercially available from Aldrich Chemical Co.), (21) (1,2,2,6,6-pentamethyl-4-piperidinyl/β-tetramethyl-3,9-(2,4,8,10-tetra oxo-spiro-(5,5)undecane)diethyl)-1,2,3,4-butane tetracarboxylate (commercially available from Fairmount), (22) (2,2,6,6-tetramethyl-4-piperidinyl)-1,2,3,4-butane tetracarboxylate (commercially available from Fairmount), (23) nickel dibutyl dithio carbamate (commercially available as UV-Chek AM-105 from Ferro), (24) 2-amino-2',5-dichlorobenzophenone (Aldrich 10, 515-5), (25) 2'-amino-4',5'-dimethoxyacetophenone (Aldrich 32, 922-3), (26) 2-benzyl-2-(dimethylamino)-4'-morpholino butyrophenone (Aldrich 40, 564-7), (27) 4'-benzyloxy-2'-hydroxy-3'-methylacetophenone (Aldrich 29, 884-0), (28) 4,4'-bis(diethylamino)benzophenone (Aldrich 16,032-6), (29) 5-chloro-2-hydroxy benzophenone (Aldrich C4, 470-2), (30) 4'-piperazinoacetophenone (Aldrich 13, 646-8), (31) 4'-piperidinoacetophenone (Aldrich 11, 972-5), (32) 2-amino-5-chlorobenzophenone (Aldrich A4, 556-4), (33) 3,6-bis(2-methyl-2-morpholinopropionyl)-9-octylcarbazole (Aldrich 46,073-7), and the like, as well as mixtures thereof.

TACKIFIERS. The ink may also optionally include tackifiers, such as FORAL 85, a glycerol ester of hydrogenated abietic (rosin) acid (commercially available from Hercules), FORAL 105, a pentaerythritol ester of hydroabietic (rosin) acid (commercially available from Hercules), CELLOLYN 21, a hydroabietic (rosin) alcohol ester of phthalic acid (commercially available from Hercules), KE-100, a triglyceride of hydrogenated abietic (rosin) acid (commercially available from Arakawa Chemical Industries, Ltd.), Arakawa KE-311 Resin, a triglyceride of hydrogenated abietic (rosin) acid (commercially available from Arakawa Chemical Industries, Ltd.), synthetic polyterpene resins such as NEVTAC 2300, NEVIAC 100, and NEVRAC 80 (commercially available from Neville Chemical Company), WINGTACK 86, a modified synthetic polyterpene resin (commercially available from Goodyear), and the like. The tackifier, when present, may be present in the ink in any desired or effective amount, such as at least about 0.1% by weight of the ink, at least about 5%, or no more than about 50%, although the amount can be outside of these ranges.

CONDUCTIVITY ENHANCING AGENTS. An optional conductivity enhancing agent may also be included. Many ink vehicles of solid inks have an electrical conductivity of essentially zero. Thus, conductivity enhancing agents may be added to the ink vehicle to provide consistent conductivity to the ink. The conductivity is used as an input signal for a level sensor in the ink reservoir of the ink jet device.

In embodiments, the conductivity enhancing agent may be an organic salt formed from an organic base and an acid. The organic base of the organic salt of the conductivity enhancing agent may be an organic amine and have at least one long hydrocarbon chain. "Long hydrocarbon chain" refers to, for example, a linear or branched carbon alkyl or aryl chain having from about 10 carbons to about 50 carbons, such as from about 15 to about 40 carbons or from about 15 carbons to about 30 carbons. The long carbon chain of the organic salt allows it to be miscible in the ink vehicle.

Unless otherwise required, the optional additives, when present may each, or in combination, be present in the ink in any desired or effective amount, such as from about 0.1% to about 10% by weight of the ink or from about 3% to about 5%.

In embodiments, the solid ink may also optionally contain other materials, which may depend upon the type of printer in which the ink is used. For example, the ink vehicle composition is typically designed for use in either a direct printing mode or an indirect or offset printing transfer system.

Ink Preparation

The ink compositions can be prepared by any desired or suitable methods. For example, the components of the ink vehicle can be mixed together, followed by heating the mixture to at least its melting point (for example from about 60° C. to about 150° C., about 80° C. to about 120° C., or about 85° C. to about 110° C.). The colorant may be added before the ink ingredients have been heated or after the ink ingredients have been heated. The molten mixture may be subjected to simple stir-mixing, high shear mixing, or grinding; for example, in a high shear mixer, in an extruder, in a media mill, in a ball mill, in a homogenizer, or in combinations of the apparatus, to effect dispersion of the colorant in the ink carrier to obtain a substantially stable, homogeneous, and uniform melt. The resulting melt can be further mixed, and subjected to further mixing or grinding, with other ink ingredients to fine tune its properties for a particular printing system. The resulting ink may then be filtered at 120° C. and cooled to ambient temperature (typically from about 20° C. to about 25° C.). The inks are solid at ambient temperature. In an embodiment, during the formation process, the molten inks are poured into molds and then cooled to form solid ink sticks. Suitable ink preparation techniques are disclosed in U.S. Pat. No. 7,186,762, the disclosure of which is incorporated herein by reference in its entirety.

In embodiments, the inks have a viscosity of from about 1 to about 40 centipoise (cP), such as from about 5 to about 15 cP or from about 8 to about 12 cP, at an elevated temperature suitable for ink jet printing, such as temperatures of from about 50° C. to about 150° C., from about 70° C. to about 130° C., or from about 80° C. to about 130° C. The inks may jet at lower temperatures and, thus, require lower amounts of energy for jetting. In this regard, the inks herein may be low energy inks. Low jetting temperature inks have a jetting viscosity of about 9 to about 13 cP, such as from about 10 to about 11 cP, from about 10.25 to about 10.75 cP or from about 10.45 to about 10.85 cP, at jetting temperatures of about 107° C. to about 111° C., although the viscosity and temperature values can be outside theses ranges.

The solid ink may contain any combination of elements, as long as it meets physical properties encompassed by this disclosure.

Image Forming and Inkjet Devices

Solid ink jet processes are well known and are described, for example, in U.S. Pat. Nos. 4,601,777, 4,251,824, 4,410, 899, 4,412,224 and 4,532,530, the disclosures of which are incorporated herein by reference in their entirety.

Printed images may be generated with the ink described herein by incorporating the ink into an inkjet device, for example a thermal inkjet device, an acoustic inkjet device, or a piezoelectric inkjet device, and concurrently causing droplets of the molten ink to be ejected in an imagewise manner onto a substrate. The ink is typically included in at least one reservoir connected by any suitable feeding device to the ejecting channels and orifices of the inkjet head for ejecting the ink. In the jetting procedure, the inkjet head may be heated, by any suitable method, to the jetting temperature of the inks. The reservoir(s) containing the solid ink may also include heating elements to heat the ink. The solid inks are thus transformed from the solid state to a molten state for jetting. "At least one" or "one or more," as used to describe components of the inkjet device, such as the ejecting channels, orifices, etc., refers to from 1 to about 2 million, such as from about 1000 to about 1.5 million or about 10,000 to about 1 million of any such component found in the inkjet device. "At least one" or "one or more" as used to describe other components of the inkjet device such as the inkjet head, reservoir, feeder, etc., refers to from 1 to about 15, such as from 1 to about 8 or from 1 to about 4 of any such component found in the inkjet device.

The inks can also be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate. An offset or indirect printing process is also disclosed in, for example, U.S. Pat. No. 5,389,958, the disclosure of which is incorporated herein by reference. Examples of apparatuses that are suitable for printing the solid inks described herein include apparatuses comprised of at least one ink retaining reservoir to store or hold solid ink, an ink jet head for printing the ink, and an ink supply line for providing the solid ink to the ink jet head.

The ink can be jetted or transferred onto any suitable substrate or recording sheet to form an image including plain papers such as XEROX® 4200 papers, XEROX® Image Series papers, Courtland 4024 DP paper, ruled notebook paper, bond paper, and the like; silica coated papers such as Sharp Company silica coated paper, JuJo paper, HAMMERMILL LASERPRINT® paper, and the like; glossy coated papers such as XEROX® Digital Color Gloss, Sappi Warren Papers LUSTROGLOSS®, and the like; transparency materials; fabrics; textile products; plastics; polymeric films; inorganic substrates such as metals, ceramics, and wood; and the like.

Embodiments comprising the above components, particularly in view of including the ketone wax, have a lower manufacturing cost, a narrower molecular weight distribution, a narrower melting range, higher polarity, better dye dissolving power, and are made from more than 75% renewable resources.

The following examples of solid ink compositions further illustrate the foregoing embodiments. These Examples are illustrative of different compositions and conditions that can be utilized in practicing the disclosure. It will be apparent, however, that the disclosure can be practiced with many types of compositions and can have many different uses in accordance with the disclosure above and as pointed out hereinafter.

EXAMPLES

Wax Materials

In the following Examples and Comparative Examples, a variety of ketone waxes and other wax materials were used. Three ketone waxes, labeled Ketone Wax A, Ketone Wax B, and Ketone Wax C, were obtained from Kao Corporation. For comparison, two conventional polyethylene wax materials, Polywax 500, labeled PE Wax A, and a distilled Polywax 500, obtained from Polywax 500 by cutting off about 10 to about 15 wt % at the high molecular end and cutting off about 10 to about 15 wt % at the low molecular end, labeled PE Wax B, were obtained from Baker Petrolite.

Figure 1:
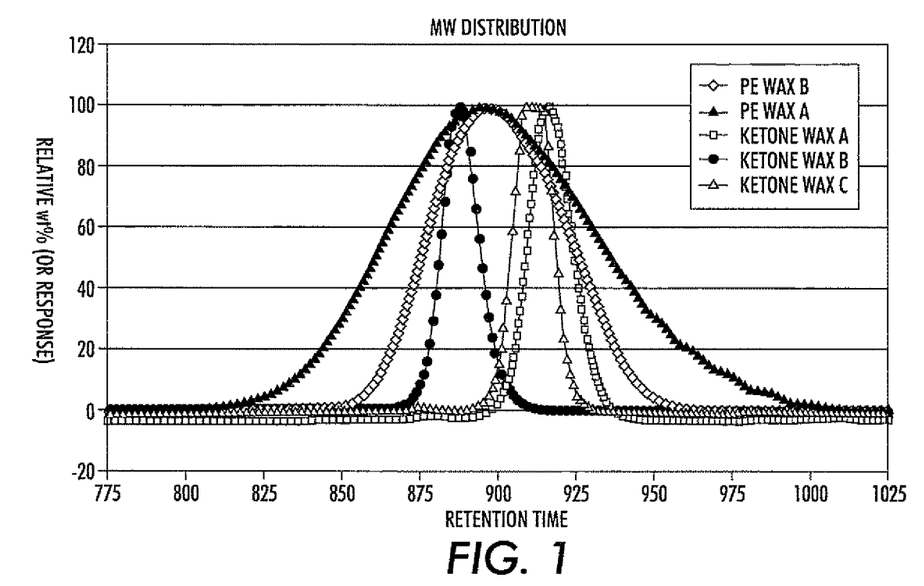
FIG. 1 shows a comparison of molecular weights of ketone waxes.

FIG. 1 compares the molecular weight distributions of the above Ketone Waxes A-C to the molecular weight distributions of the comparative PE Waxes A and B, as detected on High-Temperature Gel Permeation Chromotography (HT-GPC). The comparison shows that ketone waxes have much narrower molecular weight distributions than the commercial polyethylene waxes. The narrow molecular weight distribution is desirable for a variety of performance requirements, such as better ink transfix performance from drum, low standby temperature.

Figure 2:
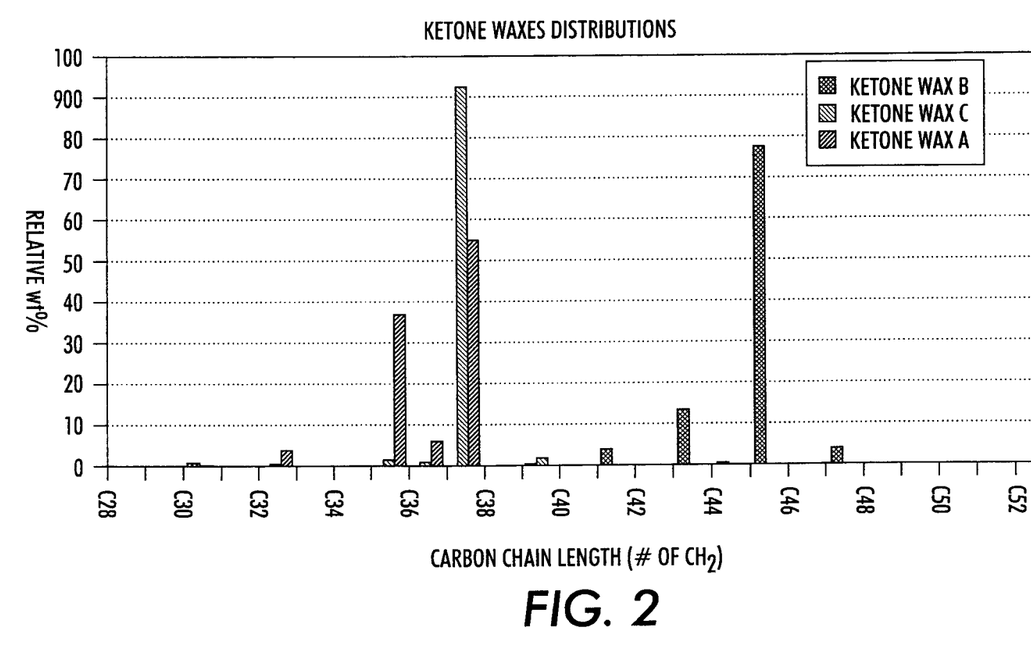
FIG. 2 shows carbon chain lengths of ketone waxes.

FIG. 2 shows the carbon chain distributions of the above ketone waxes as measured by High-Temperature Gas Chromotography (HT-GC). The HT-GC data reveals carbon chain lengths of the primary starting materials of the waxes. The results show that Ketone Wax A was made from C16 and C18 feed stocks, while Ketone Wax B was mainly made from C21 and C21 feed stock, and Ketone Wax C was mainly made from C17 feed stocks. All of these feed stocks were derived from either plant sources or animal fats. Thus, the waxes can be considered to be derived from renewable, non-fossil sources, as compared to polyethylene waxes, such as PW500 and distilled PW500, which are derived from fossil fuel.

Example 1 and Comparative Examples 1 and 2

Ink compositions were prepared using the formulations shown in Table 1, below. First, an ink base was prepared by mixing the following components by melting and homogeneously blending them together at 110° C. using an overhead stirrer: the respective wax (PE Wax A, PE Wax B, or Ketone Wax A), triamide wax (as described in U.S. Pat. No. 6,860, 930), Kenamide S-180 (a stearyl stearamide) commercially available from Chemtura Corp., KE-100 resin (a triglyceride of hydrogenated abietic (rosin) acid) from Arakawa Chemical Industries, Ltd., R12, a urethane resin (adduct of three equivalents of stearyl isocyanate and a glycerol-based alcohol, prepared as described in Example 4 of U.S. Pat. No. 6,309,453, the disclosure of which is totally incorporated herein by reference), NAUGARD-445 (an antioxidant) available from Crompton Corp., black dye (Savinyl Black NS, from Clariant), and Disperse Orange 47 (an orange dye obtained as DO-47) from Keystone Aniline Corporation. The properties of the respective inks were measured, and are shown in Table 1.

Viscosity (centipoise) was measured by a Rheometrics DSR-2000 cone-plate rheometer at 110° C. The spectral strength (SS in A*mL/g) at various wavelengths was determined using a spectrophotographic procedure based on the measurement of the ink absorption in solution by dissolving the ink in n-butanol and measuring the absorbance using a Perkin Elmer Lambda 2S UV/VIS spectrophotometer. Glass transition temperature ($T_g$ in ° C.) was measured by Dynamic Mechanic Analysis using a Rheometrics Solid Analyzer (RSA II). Peak melting point (MP in ° C.) and peak freezing point (FP in ° C.) were measured by differential scanning calorimetry (DSC) using a DUPONT 2100 calorimeter. To evaluate the dye solubility in the ink base, spectral strengths at 580 nm of the inks were used as the measurement of dye solubility in the filtered and unfiltered inks. Any undissolved dye in the ink was filtered out, resulting in the smaller spectral strength of the filtered ink compared to that of the unfiltered ink. Accordingly, the ratio of the filtered ink's spectral strength to the unfiltered ink's spectral strength ("SS ratio") was a measure of dye solubility; to the degree that the SS ratio was significantly less than 1, it indicates poor solubility of the dye in the ink base.

To measure transfix efficiency, or dropout, a chase recording sheet with a very smooth surface was run at relatively slow transfix velocity immediately after a print. The chase sheet was used to pick up any ink that was left on the intermediate transfer member. The chase sheet was scanned and the value of dropout is recorded. Increased paper/media preheating typically maximizes image transfer efficiency and ink durability. Media preheating can be accomplished using direct heat conduction through the contact of a metal plate-on-plate media preheater that contacts the paper on both sides just prior to transferring the image to the medium. In the dropout measurements, the preheat temperature was 60 C.

Another test response is duplex dropout (DDO), measured in KPPI (black pixels per inch). Duplex dropout is the number of un-transferred pixels left on the imaging drum after a duplex print cycle. The acceptable level of this particular defect is 16,000, while the target is 10,000. These numbers are based on customer acceptability of the print quality. Table 3 shows the duplex dropout of the inks of Examples 4 and 5 and the inks of Comparative Examples 5 and 6.

To measure cohesive failure, the drum temperature is increased until the ink is so soft that it fractures and, therefore, does not transfer off the drum. The temperature where the ink starts splitting is the cohesive failure temperature of the ink. Table 3 shows the cohesive failure temperatures of the inks of Examples 2, 4, and 5 and the inks of Comparative Examples 3, 4, and 5.

During a duplex print job, however, the medium already has one side imaged, and the ink itself thus must contact the metal plate preheater. If the ink smears or smudges down the page during the contact of the preheater, this is termed smudge. The highest temperature the media preheater can obtain without any noticeable smudge is the smudge temperature, and is the highest temperature at which the preheater can be operated. Accordingly, it can be desirable to increase the setpoint of the intermediate transfer member and desirable to increase the temperature of the final transfer recording sheet medium for better transfix, or to avoid blocking, duplex smudging, or the like. Thus, phase change inks that provide the flexibility of allowing such temperature increases are desirable. Table 3 shows the smudge failure temperatures for the inks of Examples 2, 4, and 5 and the inks of Comparative Examples 3-6.

The Ketone Wax A in Example 1 and the polyethylene wax PE Wax A and PE Wax B in Comparative Examples 1 and 2 were present in nearly the same percent by weight of their respective inks. However, both Comparative Examples 1 and 2 have more dyes charged before filtration, but less dye dissolved into the ink base when compared to the ink of Example 1, which is shown by lower spectral strengths for Comparative Examples 1 and 2 compared with the spectral strength of Example 1.

The lower viscosity of Ketone Wax A, compared to PE Wax A, and PE Wax B results in lower viscosities of corresponding ink, enabling larger formulation space to add more polar but more viscous ingredients such as the triamide for better dye solubility or mechanical strength.

TABLE 1

Formula and Properties of Black Inks

| | Comparative Example 1 | Comparative Example 2 | Example 1 |
|---|---|---|---|
| Wax Type | | | |
| PE Wax A | 56.50 | | |
| PE Wax B | | 56.44 | |
| Ketone Wax A | | | 57.98 |
| Triamide | 11.20 | 11.20 | 11.41 |
| Kenamide S-180 | 13.60 | 13.78 | 13.25 |
| KE-100 Resin | 10.20 | 9.88 | 9.50 |
| R12 | 4.00 | 4.03 | 3.88 |
| Naugard 445 | 0.20 | 0.18 | 0.17 |
| Black dye | 4.10 | 4.30 | 3.80 |
| DO-47 | 0.20 | 0.20 | 100.00 |
| Properties After Filtration | | | |
| Visc@110 C.(DSR) | 9.59 | 9.56 | 8.35 |
| SS(BuOH, 390 nm) | 543 | 561 | 902 |
| SS(BuOH, 481 nm) | 490 | 488 | |
| SS(BuOH, 581 nm) | 545 | 571 | 989 |
| Peak MP by DSC | 80.12 | 79.2 | 75.91 |
| Onset MP by DSC | 60.87 | 64.76 | 68.58 |
| FP by DSC | 70.3 | 71.2 | 67.95 |
| Melting range in C. (Half height width by DSC) | 18.28 | 12.97 | 7.37 |

Examples 2-5 and Comparative Examples 3-4

Ink compositions were prepared in the same manner as in Example 1 and Comparative Examples 1 and 2 above, except that the formulations are shown in Table 2 below. These ink formulations are cyan colored.

TABLE 2

Formulas and Properties of Cyan Inks

| Ink Type | Example 2 | Example 3 | Example 4 | Example 5 | Comparative Example 3 | Comparative Example 4 |
|---|---|---|---|---|---|---|
| PE Wax A | | | | | 50.2 | |
| PE Wax B | | | | | | 50 |

TABLE 2-continued

Formulas and Properties of Cyan Inks

| Ink Type | Example 2 | Example 3 | Example 4 | Example 5 | Comparative Example 3 | Comparative Example 4 |
|---|---|---|---|---|---|---|
| Ketone Wax A | 43.02 | 45.92 | | | | |
| Ketone Wax B | | | 50.00 | | | |
| Ketone Wax C | | | | 46.99 | | |
| Triamide | 22.57 | 20.00 | 15.60 | 19.2 | 13.9 | 13.95 |
| Kenamide S-180 | 17.69 | 15.00 | 16.00 | 15 | 15.14 | 15.14 |
| KE-100 Resin | 8.88 | 15.00 | 14.60 | 15 | 12.3 | 12.42 |
| R12 | 3.74 | | | | 4.42 | 4.42 |
| Naugard 445 | 0.17 | 0.18 | 0.20 | 0.19 | 0.17 | 0.17 |
| Mustang | 3.55 | 3.55 | 3.6 | 3.6 | | |
| DDBSA | 0.37 | 0.35 | | | | |
| Total | 100.0 | 100.0 | 100.0 | 100.0 | 100.0 | 100.0 |
| QC After Filtration (#3/mott) | | | | | | |
| Visc@110 C. (DSR) | 10.65 | 10.43 | 11.14 | 10.57 | 10.65 | 10.63 |
| Spec. Str. (Toluene) | 4432 | 4348 | 4290 | 4597 | 4566 | 4503 |
| DMA (Tg) | −37.08 | 10.38 | 41.7, 21.97 | 15.2, −41.1 | 11.51 | 12.88, −17.33 |
| DMA (log area) | 2.355 | 5.95 | 4.86 | 9.88 | 9.35 | 10.52 |
| MP (peak) by DSC | 75.88 | 75.81 | 86.78 | 80.32 | 81.74 | 80.81 |
| MP (onset) by DSC | 66.87 | 63.38 | 78.87 | 71.63 | 61.3 | 63.9 |
| DSC (FP) | 66.82 | 65.13 | 79.65 | 70.54 | 69.6 | 69.19 |

The inks were printed on a commercial Xerox Phaser® 8400 printer but at jetting temperature of about 110° C. Their print quality and image quality results are summarized in Table 3. Comparative Example 5 is a commercially available cyan ink for Xerox Phaser® 8860 printer, and Comparative Example 6 is a commercially available cyan ink for Xerox Phaser® 8400 printer.

TABLE 3

Print Quality and Image Quality Results

| Ink ID | Wax/Ink Type | Smudge Failure Temp (C.) | Cohesive Failure Temp (C.) | Eureka 50% Duplex Dropout |
|---|---|---|---|---|
| Example 2 | Ketone Wax A | 50 | 57 | |
| Example 3 | Ketone Wax A | | | |
| Example 4 | Ketone Wax B | 80 | 68 | 11067 |
| Example 5 | Ketone Wax C | 70 | 66 | 14564 |
| Comparative Example 3 | PE Wax A | 45 | 61 | |
| Comparative Example 4 | PE Wax B | 60 | 64 | |
| Comparative Example 5 | PE Wax B | 75 | 67 | 19832 |
| Comparative Example 6 | PW655 | 85 | | 18461 |

For print quality and image quality performance, the inks of Examples 4 and 5 (made with ketone waxes) show better performance than the ink of Comparative Example 3 (made with polyethylene wax) with higher smudge failure temperature and lower dropout, and showed comparable performance to the inks of the Comparative Examples 4 and 5.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A solid ink comprising:
   an ink vehicle that is solid at room temperature, comprising a ketone wax having a molecular weight distribution from about 1.001 to about 1.110 and at least one resin selected from the group consisting of a branched amide resin, a branched urea resin, and a branched urethane resin,
   a colorant, and
   optional additives,
   wherein the ketone wax is present in an amount of from about 5 percent to about 98 percent by weight of the solid ink, and the at least one resin is present in an amount of from about 1 percent to about 35 percent by weight of the solid ink.

2. The solid ink of claim 1, wherein the resin is a branched amide selected from the group consisting of triamides, tetraamides, and mixtures thereof.

3. The solid ink of claim 2, wherein the branched amide is a branched triamide.

4. The solid ink of claim 1, wherein the resin is a branched urethane formed as a reaction product of an alcohol and an isocyanate selected from the group consisting of monoisocyanates, diisocyanates, triisocyanates, copolymers of a diisocyanate, copolymers of a triisocyanate, polyisocyanates, and mixtures thereof.

5. The solid ink of claim 1, wherein the resin is a branched urea.

6. The solid ink of claim 1, wherein the colorant is a dye or pigment.

7. The solid ink of claim 1, wherein the solid ink has a viscosity of from about 1 to about 40 centipoise at an ejecting temperature of from about 50° C. to about 150° C.

8. The solid ink of claim 1, wherein the ink further comprises at least one additive selected from the group consisting of dispersants, propellants, biocides, defoamers, slip and leveling agents, plasticizers, viscosity modifiers, antioxidants, UV absorbers, tackifiers, adhesives, and conductivity enhancing agents.

9. The solid ink of claim 1, wherein greater than 75 percent of the ink ingredients are made from renewable resources.

10. The solid ink of claim 1, wherein the ketone wax is selected from the group consisting of alkyl alkyl ketones, alkyl aryl ketones, aryl aryl ketones, aryl arylalkyl ketones, aryl alkylaryl ketones, arylalkyl arylalkyl ketones, arylalkyl alkylaryl ketones, and alkylaryl alkylaryl ketones.

11. The solid ink of claim 1, wherein the ketone wax is present in an amount of from about 15 percent to about 70 percent by weight of the solid ink.

12. The solid ink of claim 1, wherein the ketone wax is present as a majority component of the ink vehicle.

13. The solid ink of claim 1, wherein the at least one resin is selected from the group consisting of a branched urea resin and a branched urethane resin.

14. A method of making a solid ink, comprising:
mixing an ink vehicle, a colorant, and optional additives,
the ink vehicle comprising:
a ketone wax having a molecular weight distribution from about 1.001 to about 1.110 and
at least one resin selected from the group consisting of a branched amide resin, a branched urea resin, and a branched urethane resin;
heating the mixture; and
cooling the heated mixture to form a solid ink,
wherein the ketone wax is present in an amount of from about 5 percent to about 98 percent by weight of the solid ink, and the at least one resin is present in an amount of from about 1 percent to about 35 percent by weight of the solid ink.

15. The method of claim 14, wherein the mixture is heated to at least the melting point of the ink vehicle.

16. The method of claim 14, wherein the resin is a branched amide selected from the group consisting of triamides, tetraamides, and mixtures thereof.

17. The method of claim 16, wherein the branched amide is a branched triamide.

18. The method of claim 14, wherein the resin is a branched urethane formed as a reaction product of an alcohol and an isocyanate selected from the group consisting of monoisocyanates, diisocyanates, triisocyanates, copolymers of a diisocyanate, copolymers of a triisocyanate, polyisocyanates, and mixtures thereof.

19. A method of forming an image, comprising:
applying a solid ink to a substrate,
wherein the solid ink comprises:
an ink vehicle that is solid at room temperature, comprising a ketone wax having a molecular weight distribution from about 1.001 to about 1.110 and at least one resin selected from the group consisting of a branched amide resin, a branched urea resin, and a branched urethane resin,
a colorant, and
optional additives,
wherein the ketone wax is present in an amount of from about 5 percent to about 98 percent by weight of the solid ink, and the at least one resin is present in an amount of from about 1 percent to about 35 percent by weight of the solid ink.

* * * * *